United States Patent
Kalyanasundaram et al.

(10) Patent No.: US 11,240,830 B2
(45) Date of Patent: Feb. 1, 2022

(54) DETERMINING THE MBB UE TO PUNCTURE TO ACCOMMODATE URLLC TRAFFIC

(71) Applicant: Nokia Technologies Oy, Espoo (FI)

(72) Inventors: Suresh Kalyanasundaram, Bangalore (IN); Klaus Pedersen, Aalborg (DK); Hans Kroener, Geislingen (DE); Rajeev Agrawal, Glenview, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/981,060

(22) PCT Filed: Mar. 20, 2018

(86) PCT No.: PCT/US2018/023372
§ 371 (c)(1),
(2) Date: Sep. 15, 2020

(87) PCT Pub. No.: WO2019/182571
PCT Pub. Date: Sep. 26, 2019

(65) Prior Publication Data
US 2021/0007120 A1    Jan. 7, 2021

(51) Int. Cl.
*H04W 72/12* (2009.01)
*H04B 7/0452* (2017.01)
(Continued)

(52) U.S. Cl.
CPC ...... *H04W 72/1242* (2013.01); *H04B 7/0452* (2013.01); *H04L 1/0013* (2013.01);
(Continued)

(58) Field of Classification Search
CPC ............. H04W 72/1242; H04W 28/04; H04W 72/046; H04W 72/082; H04W 72/085; H04B 7/0452; H04L 1/0013; H04L 5/0037
See application file for complete search history.

(56) References Cited

U.S. PATENT DOCUMENTS

2017/0285130 A1    10/2017 Kim et al.
2018/0368133 A1*  12/2018 Park .................... H04W 72/048
(Continued)

FOREIGN PATENT DOCUMENTS

WO    WO 2017/141082 A1    8/2017
WO    WO 2017141082 A1     8/2017

OTHER PUBLICATIONS

3GPP TSG RAN WG1 NR Ad-Hoc Meeting, Spokane, USA, Jan. 16-20, 2017, R1-1700374, "Downlink Multiplexing of eMBB and URLLC Transmissions", Intel Corporation, 12 pgs.
(Continued)

*Primary Examiner* — Afshawn M Towfighi
(74) *Attorney, Agent, or Firm* — Harrington & Smith

(57) ABSTRACT

Methods, devices, and computer program products concerning accommodating ultra-reliable low latency communications (URLLC) traffic by making a determination of which mobile broadband (MBB) user equipment (UE) to puncture, where in response to an indication that URLLC traffic needs to be scheduled in the midst of ongoing MBB transmissions in a wireless communications network, the determination is made from a plurality of MBB UEs with the ongoing MBB transmissions, of a set of the plurality scheduled for transmission in a slot required by the URLLC traffic. From that set of MBB UEs, a subset of MBB UEs for puncturing is chosen, where that choice is made at least in relation to accommodating a reliability constraint of the URLLC traffic, maximizing a sum proportional fairness metric of the plu- (Continued)

rality of MBB UEs, and minimizing a block error rate in a computation of a proportional fairness metric for each UE of the subset.

20 Claims, 2 Drawing Sheets

(51) Int. Cl.
  *H04L 1/00* (2006.01)
  *H04L 5/00* (2006.01)
  *H04W 28/04* (2009.01)
  *H04W 72/04* (2009.01)
  *H04W 72/08* (2009.01)
(52) U.S. Cl.
  CPC ............ *H04L 5/0037* (2013.01); *H04W 28/04* (2013.01); *H04W 72/046* (2013.01); *H04W 72/082* (2013.01); *H04W 72/085* (2013.01)

(56) References Cited

U.S. PATENT DOCUMENTS

| | | | |
|---|---|---|---|
| 2019/0222362 A1* | 7/2019 | Beale | H04L 1/0013 |
| 2019/0268107 A1* | 8/2019 | Yasukawa | H04L 1/1861 |
| 2019/0306836 A1* | 10/2019 | Hong | H04W 72/04 |

OTHER PUBLICATIONS

3GPP TSG RAN WG1 AH_NR Meeting, Spokane, USA, Jan. 16-20, 2017, R1-1700642, "On dynamic resource sharing between URLLC and eMBB in DL", Sequans Communications, 6 pgs.
Yang, Chao, et al., "A Weighted Proportional Fair Scheduling to Maximize Best-Effort Service Utility in Multicell Network", © 2008 IEEE, 6 pgs.
Pedersen, Klaus I., et al., "Punctured Scheduling for Critical Low Latency Data on Shared Channel with Mobile Broadband", Proceedings of IEEE Vehicular Technology conference (VTC) Fall, Toronto, Canada, Sep. 2017, 7 pgs.
K.I. Pedersen; G. Pocovi; J. Steiner; S. Khosraviad: "Punctured Scheduling for Critical Low Latency Data on a Shared Channel with Mobile Broadband", IEEE Proc. VTC-Fall, Sep. 2017 (Sep. 2017), XP002786830, cited in the application abstract p. 1, left-hand column, line 20.
Chao Yang et al: "A Weighted Proportional Fair scheduling to maximize best-effort service utility in multicell network", Personal, Indoor and Mobile Radio Communications, 2008. PIMRC 2008. IEEE 19th International Symposium on, IEEE, Piscataway, NJ, USA, Sep. 15, 2008 (Sep. 15, 2008), pp. 1-5, XP031371628, DOI: 10.1109/PIMRC.2008.4699762 ISBN: 978-1-4244-2643-0 Section IV. Weighted PF Algorithm; p. 2, right-hand column, line 11—p. 3, left-hand column, line 17.
Intel Corporation: "Downlink Multiplexing of eMBB and URLLC Transmissions", 3GPP Draft; R1-1700374 Intel-DL_EMBB_URLLC, 3rd Generation Partnership Project (3GPP), Mobile Competence Centre ; 650, Route Des Lucioles ; F-06921 Sophia-Antipolis Cedex ; France , vol. RAN WG1, no. Spokane, USA; Jan. 16, 2017-Jan. 20, 2017 Jan. 16, 2017 (Jan. 16, 2017), XP051207911, Retrieved from the Internet: URL:http://www.3gpp.org/ftp/Meetings_3GPP_SYNC/RAN1/Docs/ [retrieved on Jan. 16, 2017] p. 1, line 7—p. 10, line 18.
Sequans Communications: "On dynamic resource sharing between URLLC and eMBB in DL", 3GPP Draft; R1-1700642—On Dynamic DL Resource Sharing Between URLLC and EMBB, 3rd Generation Partnership Projects (3GPP), Mobile Competence Centre ; 650, Route Des Lucioles ; F-06921 Sophia-Antipolis , vol. RAN WG1, no. Spokane, USA; Jan. 16, 2017-Jan. 20, 2017 Jan. 16, 2017 (Jan. 16, 2017), XP051208167, Retrieved from the Internet: URL:http://www.3gpp.org/ftp/Meetings_3GPP_SYNC/RAN1/Docs/ [retrieved on Jan. 16, 2017] p. 1, line 8—p. 6, line 19.
K.I. Pedersen; G. Pocovi; J. Steiner; S. Khosraviad: "Punctured Scheduling for Critical Low Latency Data on a Shared Channel with Mobile Broadband",IEEE Proc. VTC-Fall,Sep. 2017 (Sep. 2017),cited in the application.
Chao Yang et al: "A Weighted Proportional Fair scheduling to maximize best-effort service utility in multicell network",Personal, Indoor and Mobile Radio Communications, 2008. PIMRC 2008. IEEE 19th International Symposium on, IEEE, Piscataway, NJ, USA,Sep. 15, 2008 (Sep. 15, 2008), pp. 1-5, XP031371628,DOI: 10.1109/PIMRC.2008.4699762ISBN: 978-1-4244-2643-0.
Intel Corporation: "Downlink Multiplexing of eMBB and URLLC Transmissions",3GPP Draft; R1-1700374 Intel-DL_EMBB_URLLC, 3rd Generation Partnership Project (3GPP), Mobile Competence Centre ; 650, Route Des Lucioles ; F-06921 Sophia-Antipolis Cedex ; France,vol. RAN WG1, no. Spokane, USA; Jan. 16, 2017-2017012016 Jan. 2017 (Jan. 16, 2017), XP051207911,Retrieved from the Internet:URL:http://www.3gpp.org/ftp/Meetings_3GPP_SYNC/RAN1/Docs/[retrieved on Jan. 16, 2017].
Sequans Communications: "On dynamic resource sharing between URLLC and eMBB in DL",3GPP Draft; R1-1700642—On Dynamic DL Resource Sharing Between URLLC and EMBB, 3rd Generation Partnership Project (3GPP), Mobile Competence Centre ; 650, Route Des Lucioles ; F-06921 Sophia-Antipolis,vol. RAN WG1, no. Spokane, USA; Jan. 16, 2017-2017012016 Jan. 2017 (Jan. 16, 2017), XP051208167,Retrieved from the Internet:URL:http://www.3gpp.org/ftp/Meetings_3GPP_SYNC/RAN1/Docs/[retrieved on Jan. 16, 2017].

* cited by examiner

DETERMINING THE MBB UE TO PUNCTURE TO ACCOMMODATE URLLC TRAFFIC

CROSS REFERENCE TO RELATED APPLICATION

This patent application is a U.S. National Stage application of International Patent Application Number PCT/US2018/023372 filed Mar. 20, 2018, which is hereby incorporated by reference in its entirety.

TECHNICAL FIELD

This invention relates generally to multiplexing Mobile Broadband and Ultra-Reliable Low Latency Communications on the same air interface in 5G New Radio and, in particular, determining which Mobile Broadband User Equipment to puncture so as to accommodate Ultra-Reliable Low Latency Communications traffic.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

5G New Radio (NR) supports the ability to multiplex MBB (Mobile Broadband) and URLLC (Ultra-Reliable Low Latency Communications) on the same air interface, enabling expansion of IMT that go beyond those of IMT-2000 and IMT-Advanced mobile broadband (MBB) service, and also envisioning to address new services and use cases. One of the main use case scenarios identified for IMT-2020 is ultra-reliable low-latency communications, which has been seen as one of the key enablers for vertical use cases such as factory automation, Augmented Reality (AR) & Virtual Reality (VR), Smart Grids protection and so on.

URLLC traffic typically has very tight delay constraints and hence should be served with higher priority. Moreover, to satisfy its low-latency constraints, the most stringent requirement on URLLC currently being studied in 3GPP RAN WG is 99.999% reliability under the radio latency bound of 1 ms [3GPP TR38.913]. The maximum packet error rate must not be higher than $10^{-5}$, where maximum allowable radio latency, including retransmissions is down to 1 ms. With the new numerology consideration for 5G, for example 0.125 ms TTI size or even shorter mini-slot concept and each TTI contains both control and data information, there is a possibility to support Uplink (UL) transmissions (contention-based or scheduling based) with 1 ms latency.

To allow the URLLC traffic to meet its latency targets, 3GPP NR supports the URLLC traffic to puncture resource elements (REs) of an ongoing MBB transmission. 3GPP has agreed that there should be a method by which the MBB UEs whose traffic has been punctured by the URLLC transmissions are informed of the REs that have been punctured to help the MBB UE with the decoding (facilitated with the so-called pre-emption indication signaling via PDCCH). Note that in 3GPP, the term pre-emption is now used for puncturing. With the knowledge of REs that are punctured, MBB UE is able to ignore those symbols and try to decode using the rest of the un-punctured REs.

A previous writing that may be useful as background to the current invention may include the following: K. I. Pedersen, G. Pocovi, J. Steiner, S. Khosravirad, "Punctured Scheduling for Critical Low Latency Data on a Shared Channel with Mobile Broadband", in IEEE Proc. VTC-fall, September 2017. Patent publication US 20170285130A1 discloses a mechanism of communicating with MBB UE to avoid the collision.

The current invention moves beyond these techniques.

Acronyms or abbreviations that may be found in the specification and/or the drawing figures are defined within the context of this disclosure or as follows below:
3GPP Third Generation Partnership Project
5G 5th Generation
ACK Acknowledgement
AR Augmented Reality
BLER Block Error Rate
BS Base Station
CSI-RS Channel State Information-Reference Signals
CQI Channel Quality Information
DCI Downlink Control Information
DL Downlink
eMBB enhanced Mobile Broadband
eNB or eNodeB base station, evolved Node B
gNB NR/5G Node B
HARQ Hybrid Automatic Repeat Request
IP Internet Protocol
IMT International Mobile Telecommunications (4 or 4.5G or 5G)
LLC Low-Latency Constraint
LTE Long Term Evolution
LTE-A Long Term Evolution-Advanced
MCS Modulation and Coding Scheme
MBB Mobile Broadband
MME Mobility Management Entity
MSG Message
MTC Machine-Type Communications
MU-MIMO Multi-user MIMO
NACK Negative Acknowledgement
NCE Network Control Entity
NR New Radio
OFDM Orthogonal Frequency Division Multiplexing
PBCH Physical Broadcast Channel
PF Proportionally Fair
PI Preemption Indication.
PRS Physical Resource Block
QAM Quadrature Amplitude Modulation
QPSK Quadrature Phase Shift Keying
RA Resource Allocation
RAR Random Access Response
RB Resource Block
Rel Release
RE Resource Element
RS Reference Signal
RRC Radio Resource Control
Rx Receive, Reception, or Receiver
SCS Subcarrier Spacing
TB Transport Block
TBS Transport Block Size
TS Technical Specification
TRP Transmission reception point
TTI Transmission Time Interval
Tx Transmit, Transmission, or Transmitter
UCI Uplink Control Information
UE User Equipment
UL Uplink
UL-SCH Uplink Shared Channel URLLC Ultra-Reliable Low-Latency Communications
VR Virtual Reality

BRIEF SUMMARY

This section is intended to include examples and is not intended to be limiting.

An example of an embodiment of the current invention is a method that comprises, in response to an indication a URLLC traffic needs to be scheduled in the midst of ongoing MBB transmissions in a wireless communications network, determining, from a plurality of MBB UEs with the ongoing MBB transmissions, a set of the plurality scheduled for transmission in a slot required by the URLLC traffic; choosing, from the set of MBB UEs, a subset of MBB UEs for puncturing, wherein the choosing of the subset comprises: accommodating a reliability constraint of the URLLC traffic; maximizing a sum proportional fairness metric of the plurality of MBB UEs, and minimizing a block error rate in a computation of a proportional fairness metric for each UE of the subset.

An example of yet another embodiment of the current invention is a computer program product embodied on a non-transitory computer-readable medium in which a computer program is stored that, when being executed by a computer, is configured to provide instructions to control or carry out the method of the exemplary embodiment of the method in the previous paragraph.

An example of a still further embodiment of the present invention is an apparatus, comprising in response to an indication a URLLC traffic needs to be scheduled in the midst of ongoing MBB transmissions in a wireless communications network, means for determining, from a plurality of MBB UEs with the ongoing MBB transmissions, a set of the plurality scheduled for transmission in a slot required by the URLLC traffic; means for choosing, from the set of MBB UEs, a subset of MBB UEs for puncturing, wherein the choosing of the subset comprises: accommodating a reliability constraint of the URLLC traffic, maximizing a sum proportional fairness metric of the plurality of MBB UEs, and minimizing a block error rate in a computation of a proportional fairness metric for each UE of the subset.

Another example of an embodiment of the current invention is an apparatus that comprises, at least one processor and at least one memory including computer program code, wherein the at least one memory and the computer code are configured, with the at least one processor, to cause the apparatus to at least perform the following: in response to an indication a URLLC traffic needs to be scheduled in the midst of ongoing MBB transmissions in a wireless communications network, determining, from a plurality of MBB UEs with the ongoing MBB transmissions, a set of the plurality scheduled for transmission in a slot required by the URLLC traffic; choosing, from the set of MBB UEs, a subset of MBB UEs for puncturing, wherein the choosing of the subset comprises: accommodating a reliability constraint of the URLLC traffic, maximizing a sum proportional fairness metric of the plurality of MBB UEs, and minimizing a block error rate in a computation of a proportional fairness metric for each UE of the subset.

DETAILED DESCRIPTION OF THE DRAWINGS

Figure 1:
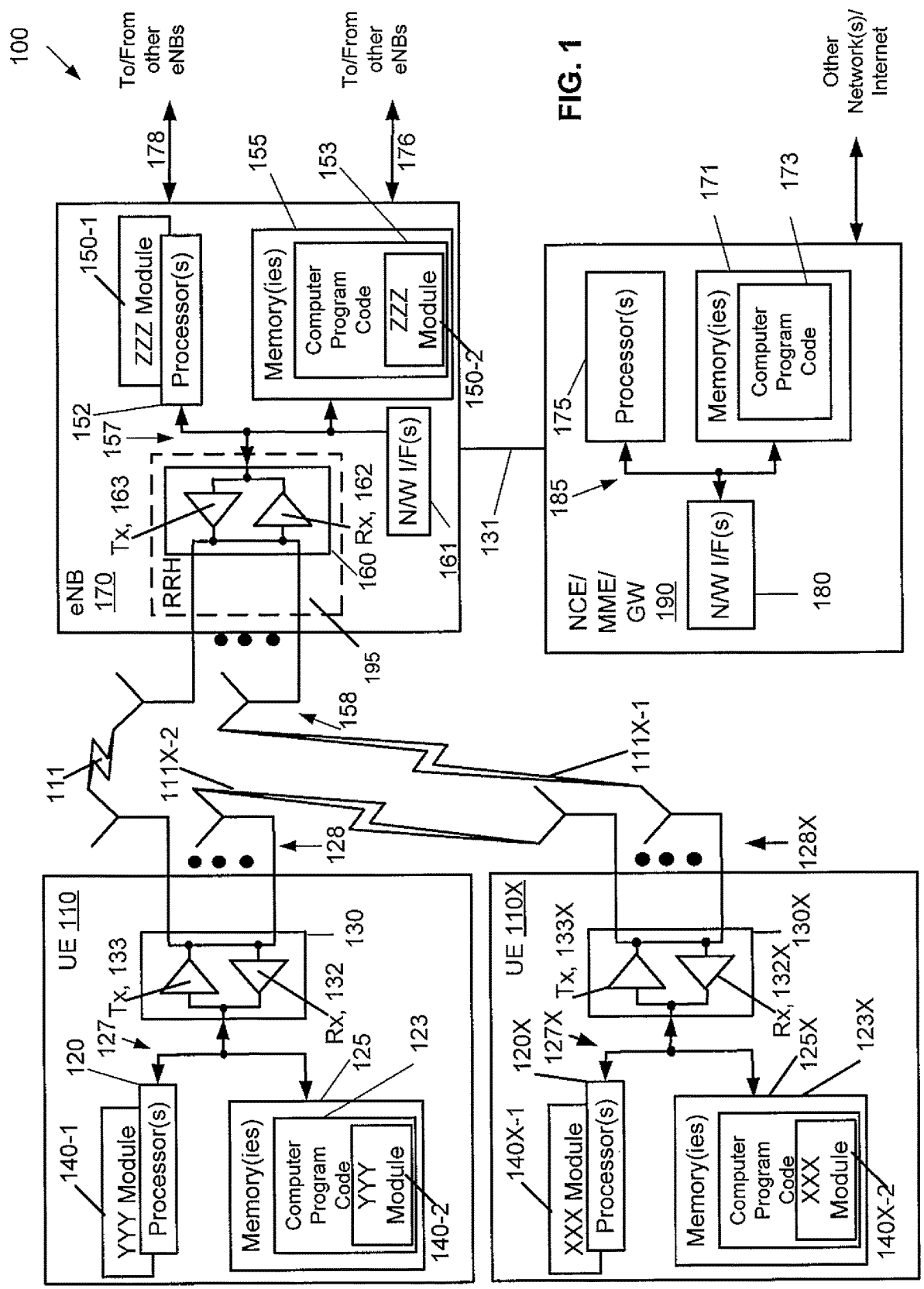
FIG. 1 is a block diagram of an exemplary system in which the exemplary embodiments may be practiced.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The problem addressed by embodiments of the present invention is the question of which ongoing MBB UE's transmission should be punctured by a new URLLC UE that needs to be scheduled. There are several issues to consider while determining which MBB UE's transmission should be punctured. Some of the factors to consider are:

The MBB UE's MCS;

The number of PRBs that have been allocated to the MBB UE;

Whether the MBB UE's transmission is a fresh transmission, first retransmission, second retransmission, etc.;

The QoS class, throughput requirement, etc. of the MBB UE;

The MBB UE's average throughput thus far, i.e., fairness consideration; and

The UE's scheduling metric, which could, for instance, be proportional fair—PF).

The only prior art that the inventors are aware of are the works discussed above, where the authors considered three different methods to determine the MBB UE whose transmission will be punctured. In the non-patent literature cited above, in one method, the authors schedule the URLLC traffic in the best resources for the URLLC traffic; in a second method, they consider puncturing the UE with the smallest MCS; and, in a third method, the UE with the largest MCS is punctured.

Nonetheless, the prior art method does not fully consider all the factors while determining the MBB UE to puncture. For instance, we expect that we can get significant performance improvement by taking into account the number of allocated PRBs while determining the MBB UE to puncture.

Before addressing the current invention directly, it might be appropriate to discuss some aspects of using different TTI sizes and factors influencing TTI selection. For a URLLC use case short TTI size is needed to meet latency requirements such that TTI size is adapted according to latency constraints. At a low offered load, using short TTI sizes reduces latency. For traffic adaptation there are clear benefits of short TTI sizes during the slow start TCP phase; adapt the TTI size depending on the transport protocol state. For UE radio conditions, these are much higher control channel overheads for cell-edge users (i.e low SINR conditions), so there is a need to switch such users from short TTI to longer TTI sizes earlier as the load increases. While operating with long TTI sizes on narrow bandwidth is attractive from coverage perspective and device cost, when using URLLC and mMTC, the cost of using short TTI sizes for MMC/URLLC must be accepted.

Regarding multiplexing of eMBB and URLLC using Preemptive Scheduling, a preemptive indication is used to make the eMBB UE aware of preemption. A full TB retransmissions can be assumed in case of NACK. But for the case where eMBB is scheduled with long TTI sizes, while URLLC is scheduled with short TTIs to fulfil the latency requirements, in order to avoid pre-reservation for transmission of sporadic arriving URLLC data bursts, punctured scheduling (in other words: preemptive scheduling) should be considered.

Regarding preemptive scheduling of URLLC traffic, when URLLC data arrives at the gNB, such data are immediately scheduled by partly overwriting (i.e. puncturing) ongoing eMBB transmissions. When using weighted proportional fair scheduling with eMBB-aware puncturing scheduling would follow one of the three aspects below:

Best Resources (BR) where the pending LLC traffic is scheduled on the PRBs where the LLC users experience the best channel quality (which implies that among all the sub-bands or PRBs, the UE has the highest SINR on that specific sub-band or PRB) per the CQI feedback and where division of resources among competing LLC users is done following the PF rule;

Lowest eMBB user (LeU) where scheduling the LLC traffic is prioritized on resources that have been allocated to the eMBB user(s) that use the lowest MCS (among the scheduled eMBB users), such that the eMBB users with low MCS may better tolerate puncturing; and Highest eMBB user (HeU) where scheduling LLC traffic is prioritized on resources that have been allocated to eMBB users with highest MCS (among the scheduled eMBB users), such that the cell-edge eMBB users are protected from experiencing puncturing.

System-level performance results of preemptive scheduling are as follows: URLLC requirements are fulfilled, but naturally the latency increases with the offered load; achieved without any pre-reservation of resources for URLLC; the eMBB performance naturally decreases as more resources are "hijacked" for urgent URLLC retransmissions; and the LeU scheme seems most attractive, although fairly close to the performance of BR and HeU.

Before turning to how an exemplary embodiment would function, FIG. 1 is presented showing a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a YYY module 140, comprising one of or both parts 140-1 and/or 140-2, which may be implemented in a number of ways. The YYY module 140 may be implemented in hardware as YYY module 140-1, such as being implemented as part of the one or more processors 120. The YYY module 140-1 may be implemented also as an integrated circuit or through other hardware such as a programmable gate array. In another example, the YYY module 140 may be implemented as YYY module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with gNB 170 via a wireless link 111.

The base station 170 (which in the shown embodiment is a gNB or NR/5G Node B but possibly an evolved NodeB for LTE, long term evolution, but could be any similar access point to a wireless network) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The gNB 170 includes a ZZZ module 150, comprising one of or both parts 150-1 and/or 150-2, which may be implemented in a number of ways. The ZZZ module 150 may be implemented in hardware as ZZZ module 150-1, such as being implemented as part of the one or more processors 152. The ZZZ module 150-1 may be implemented also as an integrated circuit or through other hardware such as a programmable gate array. In another example, the ZZZ module 150 may be implemented as ZZZ module 150-2, which is implemented as computer program code 153 and is executed by the one or more processors 152. For instance, the one or more memories 155 and the computer program code 153 are configured to, with the one or more processors 152, cause the gNB 170 to perform one or more of the operations as described herein. The one or more network interfaces 161 communicate over a network such as via the links 176 and 131. Two or more gNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

Turning to another user equipment, as depicted in FIG. 1 there is a UE 110X also in wireless communication with a wireless network 100. The user equipment 110X includes one or more processors 120X, one or more memories 125X, and one or more transceivers 130X interconnected through one or more buses 127X. Each of the one or more transceivers 130X includes a receiver, Rx, 132X and a transmitter, Tx, 133X. The one or more buses 127X may be address, data, or control buses, and may include any interconnection mechanism, such as a series of lines on a motherboard or integrated circuit, fiber optics or other optical communication equipment, and the like. The one or more transceivers 130 are connected to one or more antennas 128X. The one or more memories 125X include computer program code 123X.

The UE 110X includes an XXX module 140X, comprising one of or both parts 140X-1 and/or 140X-2, which may be implemented in a number of ways. The XXX module 140X may be implemented in hardware as XXX module 140X-1, such as being implemented as part of the one or more processors 120X. The XXX module 140X-1 may be implemented also as an integrated circuit or through other hardware such as a programmable gate array. In another example, the XXX module 140X may be implemented as XXX module 140X-2, which is implemented as computer program code 123X and is executed by the one or more processors 120X. For instance, the one or more memories 125X and the computer program code 123X may be configured to, with the one or more processors 120X, cause the user equipment 110X to perform one or more of the operations as described herein. The UE 110X communicates with eNB 170 via a wireless link 111X-1. The remote UE 110 communicates with the relay UEs 110X via a wireless link 111X-2.

Here UE 110 could represent URLLC UE in need of resources being that its transmission would have priority over an MBB UE that will be punctured and demoted as 110X in this diagram.

It is noted that description herein indicates that "cells" perform functions, but it should be clear that the eNB that forms the cell would perform the functions. The cell makes up part of an eNB. That is, there can be multiple cells per eNB. For instance, there could be three cells for a single eNB carrier frequency and associated bandwidth, each cell covering one-third of a 360-degree area so that the single eNB's coverage area covers an approximate oval or circle. Furthermore, each cell can correspond to a single carrier and an eNB may use multiple carriers. So if there are three 120-degree cells per carrier and two carriers, then the eNB has a total of 6 cells.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 125X, 155 and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 120X, 152, and 175 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 and user equipment 110X can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. For example, in an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, as in FIG. 1 for example. A computer-readable medium may comprise a computer-readable storage medium (e.g., memories 125, 125X, 155, 171 or other device) that may be any media or means that can contain or store the instructions for use by or in connection with an instruction execution system, apparatus, or device, such as a computer.

The current architecture in LTE networks is fully distributed in the radio and fully centralized in the core network. The low latency requires bringing the content close to the radio which leads to local break out and multi-access edge computing (MEC). 5G may use edge cloud and local cloud architecture. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services and augmented reality. In radio communications, using edge cloud may mean node operations to be carried out, at least partly, in a server, host or node operationally coupled to a remote radio head or base station comprising radio parts. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

One possible manner to carry out embodiments described herein is with an edge cloud using a distributed computing system. An exemplary embodiment comprises a radio node connected to a server. Exemplary embodiments implementing the system allow the edge cloud server and the radio node as stand-alone apparatuses communicating with each other via a radio path or via a wired connection or they may be located in a same entity communicating via a wired connection.

In this invention, we provide an optimal method and methods using some approximations to give less complex ways to determine the MBB UE whose transmission should be punctured such that the overall system performance is maximized. A philosophy of the inventors is to determine the UE to puncture such that we maximize the sum-PF metric of the MBB UEs, so as to minimize the impact on the MBB performance from puncturing.

It is known that the URLLC UE would be scheduled in this TTI and the number of REs that the URLLC transmission would need. Therefore, we do not need to consider the impact on the URLLC UE. It is sufficient to consider the impact on the scheduler metrics of the scheduled MBB UEs to determine the one or more MBB UE(s) whose transmission should be punctured.

In addition, when the UE to be punctured shares its resources with other UEs that are using the same resources in an MU-MIMO fashion, we take into account the interference impact due to the scheduling of the URLLC on other UEs that are using the same resource, not just the single UE whose transmission is being punctured. It is also possible that the puncturing punctures all the MBB UEs (or a subset of the MBB UEs) whose transmission overlaps with the URLLC transmission to achieve the desired reliability targets. Even in this case, our maximization of the sum multi-user PF approach is flexible enough to determine which MBB UEs transmissions should be punctured, once we know the desired number of UEs that share the same resource in an MU-MIMO fashion whose transmission should be punctured.

The exemplary embodiments herein describe determining the MBB UE to puncture so as to accommodate URLLC traffic.

In detail below a general optimization problem formulation is described followed by an incremental determination of the next single UE to puncture, simpler heuristic methods generally, and simpler heuristic methods for UEs sharing their resources in an MU-MIMO fashion.

As URLLC puncturing into eMBB transmission has been proposed in prior art, this invention moves beyond that art at least by reaching the maximization of the sum—PF metric of the MBB UEs, and sets it as the balance of URLLC efficiency with proper eMBB UE traffic disturbed.

Regarding the literature "Punctured scheduling for critical low latency data on a shared channel with mobile broadband" proposes that "the basic PF metric is weighted with a function of the MCS employed for eMBB data transmission on a given PRB." Since the prior art only uses MCS to determine the MBB UE to puncture, the performance of the current invention that looks at maximizing the PF metric or scheduler metric in general is thus not disclosed in that art and the current invention will have superior performance. Taking into account the number of allocated PRBs and the change in the probability of errors are also important aspects of this invention that distinguish it from prior art.

Regarding US 20170285130A1, it does not disclose any method to determine which MBB UE's transmission should be impacted by the transmission of the URLLC traffic and so the present invention also moves beyond it.

The expression of maximization of sum multi-user PF approach is as given in Equation (1) below. It would be a search over the discrete set of scheduled UEs in that TTI. Under such basis of maximization of sum multi-user PF approach, it quickly fixes the MBB UE group to puncture with certain performance balance which is shown in the provided various simplified algorithms as outlined in the three sections following the general optimization problem formulation below.

Those simplified algorithms, disclosed below, quickly identify the MBB UE(s) to puncture such that the negative performance impact on the MBB UEs is minimized. Note that if a fixed MBB UE puncture scheme would be chosen, such as an arbitrary MBB UE, then the negative performance impact might be large. Also note that the URLLC UE being punctured would not have any allocation before. So the URLLC UE gets to benefit from this puncturing. URLLC UE gets priority over MBB UE. So we first allow the URLLC UE to get as many resources as needed, but we make an optimal decision of exactly which MBB UE's traffic should be punctured.

As discussed below, a common feature between the scenarios is that they determine the MBB UE to puncture such that the sum PF of the MBB UEs is maximized.

General Optimization Problem Formulation

This section describes the core of which the three subsequent variants below are simplifications or approximations of. To determine which MBB UE(s) to puncture, such that the overall performance/utility is maximized, we pick that set of already scheduled MBB UE(s) to puncture such that we can accommodate the needs of the URLLC traffic while maximizing the sum proportional fairness metric of the MBB UEs.

For this general case, let's denote by S the set of MBB UEs that have been scheduled for transmission in the slot that will be punctured by the URLLC UE. Let's denote UE i's average throughput so far by $T_i$ and the TBS corresponding to the MCS and the number of PRBs allocated to UE i by $TBS_i$. We denote by $BLER_i'$ the BLER that the UE i would be expected to get if it was the UE that was punctured. We denote by $BLER_i$ the BLER the user i would achieve if the UE's transmission was not punctured. We use the "prime" notation to refer to the quantities achieved by the UE if it was the chosen UE for puncturing.

We want to determine that set of UEs $S^*_p$ whose data transmission would be punctured such that the sum-PF of the MBB UEs is maximized, subject to the constraint that the reliability requirement of the URLLC traffic is met.

$$S^*_p = \text{argmax}_{S_p} \left[ \sum_{i \in S_p} \frac{TBS_i(1 - BLER'_i)}{T_i} + \sum_{k \in S_p^m} \frac{TBS_k(1 - BLER'_k)}{T_k} + \sum_{j \in S \setminus (S_p \cup S_p^m)} \frac{TBS_j(1 - BLER_j)}{T_j} \right] \quad (1)$$

where the set $S_p$ is the set of MBB UEs whose traffic is directly punctured, $S_p^m$ is the set of UEs whose traffic is not directly punctured, but whose traffic is indirectly affected by the puncturing of the MBB UE's transmission with URLLC traffic. Typically, these UEs are those that share the resource allocation, typically in an MU-MIMO fashion, with that of the punctured UE on at least a subset of the punctured resource elements. For example, the MBB UE which was punctured might have been using a different beam when compared to the URLLC traffic's beam. This will cause a difference in BLER to those UEs in the set $S_p^m$. More than one MBB UE's data transmission may need to be punctured due to either the need to use more PRBs than what is assigned to one UE, or the need to puncture multiple UEs transmissions that are sharing the same resource in an MU-MIMO fashion.

The sum proportional fairness metric is known to maximize the sum utility across all UEs for the log-utility function, where the logarithm of the user's throughput is taken as the utility function. We also explicitly take into account the user's block error rate in the computation of the user's proportional fairness metric, unlike what is typically used in prior art. This makes the determination of the MBB UE(s) to puncture more accurate. For other utility functions, Equation (1) would be appropriately modified (where the 1/Ti in the equation would be replaced by U', which is the derivative of the utility function with respect to the throughput) to use U'R, where U' is the derivative of the user's utility function with respect to the user's throughput, and R is the instantaneous rate achievable by the UE.

Note that the need for puncturing only occurs when new URLLC traffic needs to be scheduled in the midst of an ongoing MBB transmission(s). Otherwise, if both URLLC traffic and MBB traffic need to be scheduled at the start of a slot boundary, then the URLLC traffic can already be provided a higher priority so that there is no need for puncturing. Therefore, we also recommend enforcing a strict priority for URLLC traffic for idle/unoccupied resources.

Figure 2:
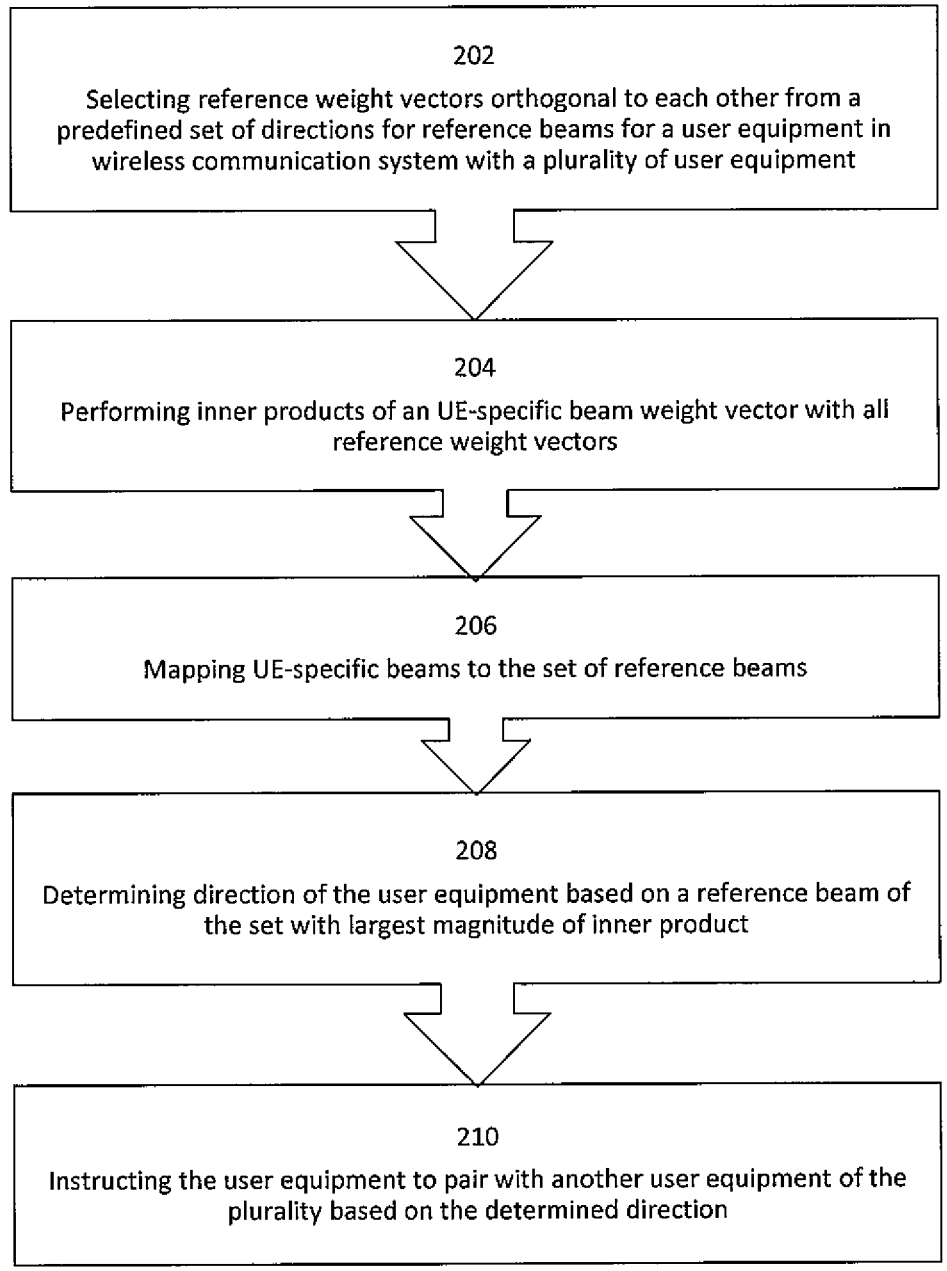
FIG. 2 is a logic flow diagram illustrating the operation of an exemplary method or methods, resulting from an execution of computer program instructions embodied on a computer readable memory, and/or functions performed by logic implemented in hardware or other means, in accordance with exemplary embodiments, which would be possible.

FIG. 2 is a logic flow diagram illustrating the operation of an exemplary method or methods, resulting from an execution of computer program instructions embodied on a computer readable memory, and/or functions performed by logic implemented in hardware or other means, in accordance with exemplary embodiments, which would be possible.

Incremental Determination of Next Single UE to Puncture

Because of the combinatorial search involved in the optimization Equation (1), in this invention, we progressively develop simpler techniques/heuristics that come close to the solution in Equation (1) but with much lower complexity. To avoid the combinatorial search in Equation (1), we may perform a sequential greedy approach of determining the UE to be punctured. In particular, we propose that the MBB UE(s) to be punctured are picked one at a time. We thus propose that we pick for puncturing that UE i* such that the sum-PP metric as shown below is maximized, again subject to Reliability constraint of the URLLC traffic being met.

$$i^* = \operatorname{argmax}_i \left[ \frac{TBS_i(1 - BLER_i')}{T_i} + \sum_{k \in S_{\{i\}}^m} \frac{TBS_k(1 - BLER_k')}{T_k} + \sum_{j \in S \setminus (\{i\} \cup S_{\{i\}}^m)} \frac{TBS_j(1 - BLER_j)}{T_j} \right] \quad (2)$$

where we have used the notation $S_{\{i\}}^m$ to refer to the set of UEs whose traffic is not directly punctured, but whose traffic is indirectly affected by the puncturing of the MBB UE i's transmission.

Once a certain set of PRBs have been determined for the URLLC traffic and some MBB UEs have already been decided for puncturing, then only other MBB UEs on the same set of PRBs multiplexed in MU-MIMO fashion may be further punctured. So Equation (2) can be incrementally solved by identifying one UE at a time until the reliability constraint of the URLLC traffic is finally met. To meet the reliability constraint of the URLLC traffic, sufficient number of UEs multiplexed in MU-MIMO fashion should be punctured, or the URLLC traffic needs to be allocated sufficient number of PRBs that may span the MBB allocation of more than one UE. In both these cases, multiple UEs' transmissions may be punctured for the URLLC traffic to meet its reliability target.

Simpler Heuristic Methods

To simplify the description, in what follows, we assume the set of users $S_p^m$ is empty, such that there are no UEs that are not punctured but are nevertheless affected by puncturing. By simplifying Equation (2), we can see that user i* is the MBB UE picked for puncturing if the following condition holds for every j∈S, j≠i*;

$$\frac{TBS_{i^*}}{T_{i^*}}(BLER_{i^*} - BLER_{i^*}') \ge \frac{TBS_j}{T_j}(BLER_j - BLER_j') \quad (3)$$

Thus we want to pick that UE that results in a smaller PF difference due to puncturing when compared to the PF difference of other UEs. From Equation (2), we would like to pick that UE for whom the difference between the PF metrics with and without puncturing to be the smallest among all UEs. Thus, ideally, the BLER difference between the BLER with and without puncturing should be small, and the PF metric of the UE selected for puncturing should be small.

As an approximation, the weights $1/T_i$ may be dropped and the sum-rate may be maximized. As another approximation, the difference in BLER may be ignored, and the UE with the smallest PF metric value $$\frac{TBS_j}{T_j}$$

may be the UE selected for puncturing.

As yet another approximation, the PF metrics of the scheduled UEs may be assumed to be approximately the same, and we may wish to pick that UE that minimizes the BLER difference with and without puncturing. As an alternative approximation, because the BLER is a monotonic function of the code rate, we may pick that UE that has the lowest code rate difference due to puncturing. This would imply that we pick that UE for which the following condition holds for every j∈S, j≠i*;

$$TBS_{i^*}\left(\frac{1}{m_{i^*}o_{i^*}'} - \frac{1}{m_{i^*}o_{i^*}}\right) \le TBS_j\left(\frac{1}{m_j o_j'} - \frac{1}{m_j o_j}\right) \quad (4)$$

Where in the above equation, $m_{i^*}$ represents the modulation order of UE i*, which takes a value of 2 bits/symbol for QPSK, 4 bits/symbol for 16-QAM and 6 bits/symbol for 64 QAM. $O_{i^*}$ is the number of OFDM symbols in the UE's PRB allocation before puncturing and $O'_{i^*}$ is the number of OFDM symbols in the UE's PRB allocation after puncturing. This would roughly imply that we pick that UE for puncturing with the largest number of PRBs allocated so as to minimize the BLER difference with and without puncturing.

This method may be generalized to pick more than one UE if, in so doing, the sum PF metric as shown in Equation (1) is maximized, with appropriate modifications to allow two or more UEs to have a modified BLER. Moreover, in some cases, given the number of PRBs needed for the URLLC UE and the MBB UEs, more than one UE may have to be punctured. In such cases as well, the above-mentioned methods would work, where two or more UEs are jointly picked to be punctured. Alternatively, to avoid having to do a joint optimization, MBB UEs may be incrementally picked as per Equation (1), if it turns out that more than one MBB UE needs to be punctured because the number of PRBs to be allocated to the URLLC UE exceeds the FRB allocation of the first chosen UE.

In addition to the above methods, there may be an additional prioritization of retransmission UEs, such that retransmission UEs may not be punctured, unless there are no other fresh transmission UEs whose transmission can be punctured.

Simpler Heuristic Methods for UEs Sharing their Resources in an MU-MIMO Fashion

To reduce the impact on other UEs whose transmissions are not directly punctured, namely, those UEs that are in the set $S_p^m$, we pick that UE that is already using the same beam as that of the URLLC UE, assuming that the punctured UE is sharing its resources with other UEs in an MU-MIMO fashion. As a heuristic, we first puncture from among those UEs that do not share their resources with other UEs in an MU-MIMO fashion. If such a UE is not available, then we pick another MBB UE that is using the same beam as the URLLC UE's best beam. If such a UE is not available, then we pick a UE such that the URLLC UE's orthogonality with other UEs using the same resource is maximized, i.e., the URLLC UE is as orthogonal as possible to the remaining MBB UEs whose transmissions are not punctured, but are sharing the same resource as the URLLC UE's resource elements.

Without in any way limiting the scope, interpretation, or application of the invention or of the claims appearing below, an advantage, benefit, or technical effect of one or more of the exemplary embodiments disclosed herein is improving the determination of which UE to puncture at varying levels of complexity over prior art methods based on MCS or randomly deciding the PRBs to puncture. As the amount of URLLC traffic increases, it becomes more important to pick the right MBB UE(s) to puncture, thus increasing the gains from the methods disclosed hi this invention.

Without in any way limiting the scope, interpretation, or application of the invention or of the claims appearing below, another advantage, benefit, or technical effect of one or more of the exemplary embodiments disclosed herein is the invention provides variants based on varying degrees of complexity so they can fit various situations.

If desired, the different functions discussed herein may be performed in a different order and/or concurrently with each other. Furthermore, if desired, one or more of the above-described functions may be optional or may be combined.

An example of an embodiment of the current invention, which can be referred to as item 1, is a method that comprises, in response to an indication a URLLC traffic needs to be scheduled in the midst of ongoing MBB transmissions in a wireless communications network, determining, from a plurality of MBB UEs with the ongoing MBB transmissions, a set of the plurality scheduled for transmission in a slot required by the URLLC traffic; choosing, from the set of MBB UEs, a subset of MBB UEs for puncturing, wherein the choosing of the subset comprises: accommodating a reliability constraint of the URLLC traffic, maximizing a sum proportional fairness metric of the plurality of MBB UEs, and minimizing a block error rate in a computation of a proportional fairness metric for each UE of the subset.

An example of a further embodiment of the current invention, which can be referred to as item 2, is the method of item 1, where the sum proportional fairness metric maximizes the sum utility across all UEs of the plurality An example of a further embodiment of the current invention, which can be referred to as item 3, is the method of item 1, where n the choosing further comprises: minimizing a block error rate of another subset of the plurality, wherein the other subset has traffic not chosen for puncturing but is indirectly affected by the punctured subset.

An example of a further embodiment of the current invention, which can be referred to as item 4, is the method of item 3, where indirectly affected comprises sharing a resource allocation with the UEs of the punctured subset on at least a subset of the punctured resource elements.

An example of a further embodiment of the current invention, which can be referred to as item 5, is the method of item 4, where the UEs of the punctured subset use a beam different from the URLLC traffic's beam.

An example of a further embodiment of the current invention, which can be referred to as item 6, is the method of item 1, where choosing the punctured subset further comprises: determining that set of UEs $S^*_p$ whose data transmission would be punctured such that the sum-PF of the MBB UEs is maximized, subject to the constraint that the reliability requirement of the URLLC traffic is met, as equation (1) with the variables, constants, and parameters of equation (1) as defined herein.

An example of a further embodiment of the current invention, which can be referred to as item 7, is the method of item 1, where the punctured subset is chosen one UE at a time by a sequential greedy approach until the reliability constraint of the URLLC traffic is met, wherein for reliability constraint of the URLLC traffic to be met comprises a sufficient number of UEs multiplexed in MU-MIMO fashion should be punctured or the URLLC traffic needs to be allocated a sufficient number of PRBs spanning the MBB allocation of one or more UEs.

An example of a further embodiment of the current invention, which can be referred to as item 8, is the method of item 1, further comprising: once a certain set of PRBs have been determined for the URLLC traffic and a first subset of MBB UEs is chosen for puncturing, choosing for further puncturing a second subset of MBB UEs on the same set of PRBs multiplexed in MU-MIMO fashion.

An example of a further embodiment of the current invention, which can be referred to as item 9, is the method of item 1, where the punctured subset comprises only UEs that already using a beam to be used for the URLLC traffic, wherein the punctured subset shares resources with at least another UE in an MU-MIMO fashion.

An example of a further embodiment of the current invention, which can be referred to as item 10, is the method of item 1, further comprising: puncturing a first group consisting of UEs not sharing resources with other UEs in an MU-MIMO fashion; in response to the first group being unavailable, puncturing a second group consisting of UEs using the same beam as the URLLC traffic's best beam; in response to both the first group and the second group being unavailable, puncturing a third group such that the URLLC traffic's orthogonality with other UEs using the same resource is maximized.

An example of a further embodiment of the current invention, which can be referred to as item 11, is the method of item 1, where the relatability constraint for puncturing that UE is i* such that the sum-PF metric as shown below is maximized, subject to a basic quality constraint of the URLLC traffic being met as equation (2) with the variables, constants, and parameters of equation (1) as defined herein.

An example of a further embodiment of the current invention, which can be referred to as item 12, is the method of item 1, where maximize means being sufficiently high or leveraging a sum a sum proportional fairness metric to a level enabling the basic MBB UE traffic.

An example of a further embodiment of the current invention, which can be referred to as item 13, is the method of item 1, where minimizing means leveraging the BLER to a level that enables maintain the UE subset quality.

An example of a further embodiment of the current invention, which can be referred to as item 14, is the method of any preceding item, where the determining and/or the choosing is performed by a base station.

An example of an additional embodiment of the instant invention, which can be referred to as item 15, is a computer program that comprises code for controlling or performing the method of any of the proceeding claims.

An example of an additional embodiment of the instant invention, which can be referred to as item 16, where a computer program product comprises a computer-readable medium bearing the computer program code of claim 15 embodied therein for use with a computer.

An example of yet another embodiment of the current invention, which can be referred to as item 17, is a computer program product embodied on a non-transitory computer-readable medium in which a computer program is stored that, when being executed by a computer, is configured to provide instructions to control or carry out the method of any of items 1-14.

An example of a still further embodiment of the present invention, which can be referred to as item 18, is an apparatus, comprising means for performing each step of the items of claims 1-14.

An example of an embodiment of the current invention, which can be referred to as item 19, is an apparatus that comprises, at least one processor and at least one memory including computer program code, wherein the at least one memory and the computer code are configured, with the at least one processor, to cause the apparatus to at least perform the following: in response to an indication a URLLC traffic needs to be scheduled in the midst of ongoing MBB transmissions in a wireless communications network, determining, from a plurality of MBB UEs with the ongoing MBB transmissions, a set of the plurality scheduled for transmission in a slot required by the URLLC traffic; choosing, from the set of MBB UEs, a subset of MBB UEs for puncturing, wherein the choosing of the subset comprises: accommodating a reliability constraint of the URLLC traffic, maximizing a sum proportional fairness metric of the plurality of MBB UEs, and minimizing a block error rate in a computation of a proportional fairness metric for each UE of the subset.

An example of another embodiment of the present invention, which can be referred to as item 20, is the apparatus of item 19, where the sum proportional fairness metric maximizes the sum utility across all UEs of the plurality An example of another embodiment of the present invention, which can be referred to as item 21, is the apparatus of item 19, where the choosing further comprises: minimizing a block error rate of another subset of the plurality, wherein the other subset has traffic not chosen for puncturing but is indirectly affected by the punctured subset.

An example of another embodiment of the present invention, which can be referred to as item 22, is the apparatus of item 21, where indirectly affected comprises sharing a resource allocation with the UEs of the punctured subset on at least a subset of the punctured resource elements.

An example of another embodiment of the present invention, which can be referred to as item 23, is the apparatus of item 22, where the UEs of the punctured subset use a beam different from the URLLC traffic's beam.

An example of another embodiment of the present invention, which can be referred to as item 24, is the apparatus of item 19, where choosing the punctured subset further comprises: determining that set of UEs $S^*_p$ whose data transmission would be punctured such that the sum-PF of the MBB UEs is maximized, subject to the constraint that the reliability requirement of the URLLC traffic is met, as equation (1) with the variables, constants, and parameters of equation (1) as defined herein.

An example of another embodiment of the present invention, which can be referred to as item 25, is the apparatus of item 19, where the punctured subset is chosen one UE at a time by a sequential greedy approach until the reliability constraint of the URLLC traffic is met, wherein for reliability constraint of the URLLC traffic to be met comprises a sufficient number of UEs multiplexed in MU-MIMO fashion should be punctured or the URLLC traffic needs to be allocated a sufficient number of PRBs spanning the MBB allocation of one or more UEs.

An example of another embodiment of the present invention, which can be referred to as item 26, is the apparatus of item 19, where the at least one memory and the computer code are further configured, with the at least one processor, to cause the apparatus to at least perform the following: once a certain set of PRBs have been determined for the URLLC traffic and a first subset of MBB UEs is chosen for puncturing, choosing for further puncturing a second subset of MBB UEs on the same set of PRBs multiplexed in MU-MIMO fashion.

An example of another embodiment of the present invention, which can be referred to as item 27, is the apparatus of item 19, where the punctured subset comprises only UEs that already using a beam to be used for the URLLC traffic, wherein the punctured subset shares resources with at least another UE in an MU-MIMO fashion.

An example of another embodiment of the present invention, which can be referred to as item 28, is the apparatus of item 27, where the at least one memory and the computer code are further configured, with the at least one processor, to cause the apparatus to at least perform the following: puncturing a first group consisting of UEs not sharing resources with other UEs in an MU-MIMO fashion; in response to the first group being unavailable, puncturing a second group consisting of UEs using the same beam as the URLLC traffic's best beam; in response to both the first group and the second group being unavailable, puncturing a third group such that the URLLC traffic's orthogonality with other UEs using the same resource is maximized.

An example of another embodiment of the present invention, which can be referred to as item 29, is the apparatus of item 19, where the relatability constraint for puncturing that UE is i* such that the sum-PF metric as shown below is maximized, subject to a basic quality constraint of the URLLC traffic being met as equation (2) with the variables, constants, and parameters of equation (1) as defined herein.

An example of another embodiment of the present invention, which can be referred to as item 30, is the apparatus of item 19, where maximize means being sufficiently high or leveraging a sum a sum proportional fairness metric to a level enabling the basic MBB UE traffic.

An example of another embodiment of the present invention, which can be referred to as item 31, is the apparatus of item 19, where minimizing means leveraging the BLER to a level that enables maintain the UE subset quality.

An example of another embodiment of the present invention, which can be referred to as item 32, is the apparatus of any of proceeding items 19-31, wherein the determining and/or the choosing is performed by a base station.

Although various aspects are set out above, other aspects comprise other combinations of features from the described embodiments, and not solely the combinations described above. If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention.

What is claimed is:

1. A method comprising:
   in response to an indication a URLLC traffic needs to be scheduled in the midst of ongoing MBB transmissions in a wireless communications network, determining, from a plurality of MBB UEs with the ongoing MBB transmissions, a set of the plurality scheduled for transmission in a slot required by the URLLC traffic;
   choosing, from the set of MBB UEs, a subset of MBB UEs for puncturing, wherein the choosing of the subset comprises:
   accommodating a reliability constraint of the URLLC traffic,
   maximizing a sum proportional fairness metric of the plurality of MBB UEs, and minimizing a block error rate in a computation of a proportional fairness metric for each UE of the subset.

2. The method of claim 1, where the sum proportional fairness metric maximizes the sum utility across all UEs of the plurality.

3. The method of claim 1, wherein the choosing further comprises: minimizing a block error rate of another subset of the plurality, wherein the other subset has traffic not chosen for puncturing but is indirectly affected by the punctured subset; and
   said indirectly affected comprises sharing a resource allocation with the UEs of the punctured subset on at least a subset of the punctured resource elements; and the UEs of the punctured subset use a beam different from the URLLC traffic's beam.

4. The method of claim 1, choosing the punctured subset further comprises: determining that set of UEs $S^*_p$ whose data transmission would be punctured such that the sum-PF of the MBB UEs is maximized, subject to the constraint that the reliability requirement of the URLLC traffic is met, as $$S^*_p = \mathrm{argmax}_{S_p}\left[\sum_{i \in S_p} \frac{TBS_i(1 - BLER'_i)}{T_i} + \sum_{k \in S^m_p} \frac{TBS_k(1 - BLER'_k)}{T_k} + \sum_{j \in S \setminus (S_p \cup S^m_p)} \frac{TBS_j(1 - BLER_j)}{T_j}\right]$$

where the set $S_p$ is the set of MBB UEs whose traffic is directly punctured, $S_v^m$ is the set of UEs whose traffic is not directly punctured, but whose traffic is indirectly affected by the puncturing of the MBB UE's transmission with URLLC traffic.

5. The method of claim 1, wherein the punctured subset is chosen one UE at a time by a sequential greedy approach until the reliability constraint of the URLLC traffic is met, wherein for reliability constraint of the URLLC traffic to be met comprises a sufficient number of UEs multiplexed in MU-MIMO fashion should be punctured or the URLLC traffic needs to be allocated a sufficient number of PRBs spanning the MBB allocation of one or more UEs.

6. The method of claim 1, further comprising:
   once a certain set of PRBs have been determined for the URLLC traffic and a first subset of MBB UEs is chosen for puncturing, choosing for further puncturing a second subset of MBB UEs on the same set of PRBs multiplexed in MU-MIMO fashion.

7. The method of claim 1, wherein the punctured subset comprises only UEs that already using a beam to be used for the URLLC traffic, wherein the punctured subset shares resources with at least another UE in an MU-MIMO fashion; and
   puncturing a first group consisting of UEs not sharing resources with other UEs in an MU-MIMO fashion;
   in response to the first group being unavailable, puncturing a second group consisting of UEs using the same beam as the URLLC traffic's best beam;
   in response to both the first group and the second group being unavailable, puncturing a third group such that the URLLC traffic's orthogonality with other UEs using the same resource is maximized.

8. A computer program comprising code for controlling or performing the method of claim 1.

9. A computer program product comprising a non-transitory computer-readable medium bearing the computer program code of claim 8 embodied therein for use with a computer.

10. The method of claim 1, where the relatability constraint for puncturing that UE is i* such that the sum-PF metric as shown below is maximized, subject to a basic quality constraint of the URLLC traffic being met $$i^* = \mathrm{argmax}_i\left[\frac{TBS_i(1 - BLER'_i)}{T_i} + \sum_{k \in S^m_{\{i\}}} \frac{TBS_k(1 - BLER'_k)}{T_k} + \sum_{j \in S \setminus \{i\} \cup S^m_{\{i\}}} \frac{TBS_j(1 - BLER_j)}{T_j}\right]$$

where $S_{\{i\}}^m$ refers to the set of UEs whose traffic is not directly punctured, but whose traffic is indirectly affected by the puncturing of the MBB UE i's transmission.

11. A computer program product embodied on a non-transitory computer-readable medium in which a computer program is stored that, when being executed by a computer, is configured to provide instructions to control or carry out in response to an indication a URLLC traffic needs to be scheduled in the midst of ongoing MBB transmissions in a wireless communications network, determining, from a plurality of MBB UEs with the ongoing MBB transmissions, a set of the plurality scheduled for transmission in a slot required by the URLLC traffic; choosing, from the set of MBB UEs, a subset of MBB UEs for puncturing, wherein the choosing of the subset comprises: accommodating a reliability constraint of the URLLC traffic, maximizing a sum proportional fairness metric of the plurality of MBB UEs, and minimizing a block error rate in a computation of a proportional fairness metric for each UE of the subset.

12. An apparatus comprising means, in response to an indication a URLLC traffic needs to be scheduled in the midst of ongoing MBB transmissions in a wireless communications network, means for determining, from a plurality of MBB UEs with the ongoing MBB transmissions, a set of the plurality scheduled for transmission in a slot required by the URLLC traffic; means for choosing, from the set of MBB UEs, a subset of MBB UEs for puncturing, wherein the choosing of the subset comprises: accommodating a reliability constraint of the URLLC traffic, maximizing a sum proportional fairness metric of the plurality of MBB UEs, and minimizing a block error rate in a computation of a proportional fairness metric for each UE of the subset.

13. An apparatus comprising:
 at least one processor; and
 at least one non-transitory memory including computer program code,
 wherein the at least one memory and the computer code are configured, with the at least one processor, to cause the apparatus to at least perform the following:
  in response to an indication a URLLC traffic needs to be scheduled in the midst of ongoing MBB transmissions in a wireless communications network, determining, from a plurality of MBB UEs with the ongoing MBB transmissions, a set of the plurality scheduled for transmission in a slot required by the URLLC traffic;
  choosing, from the set of MBB UEs, a subset of MBB UEs for puncturing, wherein the choosing of the subset comprises:
  accommodating a reliability constraint of the URLLC traffic,
  maximizing a sum proportional fairness metric of the plurality of MBB UEs, and minimizing a block error rate in a computation of a proportional fairness metric for each UE of the subset.

14. The apparatus of claim 13, where the sum proportional fairness metric maximizes the sum utility across all UEs of the plurality.

15. The apparatus of claim 13, wherein the choosing further comprises: minimizing a block error rate of another subset of the plurality, wherein the other subset has traffic not chosen for puncturing but is indirectly affected by the punctured subset; and
 said indirectly affected comprises sharing a resource allocation with the UEs of the punctured subset on at least a subset of the punctured resource elements; and
 the UEs of the punctured subset use a beam different from the URLLC traffic's beam.

16. The apparatus of claim 13, choosing the punctured subset further comprises: determining that set of UEs $S^*_p$ whose data transmission would be punctured such that the sum-PF of the MBB UEs is maximized, subject to the constraint that the reliability requirement of the URLLC traffic is met, as $$S^*_p = \mathrm{argmax}_{S_p} \left[ \sum_{i \in S_p} \frac{TBS_i(1 - BLER'_i)}{T_i} + \sum_{k \in S_p^m} \frac{TBS_k(1 - BLER'_k)}{T_k} + \sum_{j \in S \setminus (S_p \cup S_p^m)} \frac{TBS_j(1 - BLER_j)}{T_j} \right]$$

where the set $S_p$ is the set of MBB UEs whose traffic is directly punctured, $S_v^m$ is the set of UEs whose traffic is not directly punctured, but whose traffic is indirectly affected by the puncturing of the MBB UE's transmission with URLLC traffic.

17. The apparatus of claim 13, wherein the punctured subset is chosen one UE at a time by a sequential greedy approach until the reliability constraint of the URLLC traffic is met, wherein for reliability constraint of the URLLC traffic to be met comprises a sufficient number of UEs multiplexed in MU-MIMO fashion should be punctured or the URLLC traffic needs to be allocated a sufficient number of PRBs spanning the MBB allocation of one or more UEs.

18. The apparatus of claim 13, wherein the at least one memory and the computer code are further configured, with the at least one processor, to cause the apparatus to at least perform the following:
 once a certain set of PRBs have been determined for the URLLC traffic and a first subset of MBB UEs is chosen for puncturing, choosing for further puncturing a second subset of MBB UEs on the same set of PRBs multiplexed in MU-MIMO fashion.

19. The apparatus of claim 13, wherein the punctured subset comprises only UEs that already using a beam to be used for the URLLC traffic, wherein the punctured subset shares resources with at least another UE in an MU-MIMO fashion; and
 the at least one memory and the computer code are further configured, with the at least one processor, to cause the apparatus to at least perform the following: puncturing a first group consisting of UEs not sharing resources with other UEs in an MU-MIMO fashion;
 in response to the first group being unavailable, puncturing a second group consisting of UEs using the same beam as the URLLC traffic's best beam;
 in response to both the first group and the second group being unavailable, puncturing a third group such that the URLLC traffic's orthogonality with other UEs using the same resource is maximized.

20. The method apparatus of claim 13, where the relatability constraint for puncturing that UE is i* such that the sum-PF metric as shown below is maximized, subject to a basic quality constraint of the URLLC traffic being met, $$i^* = \mathrm{argmax}_i \left[ \frac{TBS_i(1 - BLER'_i)}{T_i} + \sum_{k \in S_{\{i\}}^m} \frac{TBS_k(1 - BLER'_k)}{T_k} + \sum_{j \in S \setminus (\{i\} \cup S_{\{i\}}^m)} \frac{TBS_j(1 - BLER_j)}{T_j} \right]$$

where $S_{\{i\}}^m$ refers to the set of UEs whose traffic is not directly punctured, but whose traffic is indirectly affected by the puncturing of the MBB UE is transmission.

* * * * *